MAGNETIC TAPE RECORDERS

Filed Oct. 6, 1964 4 Sheets-Sheet 1

INVENTOR.
RONALD WALKER
BY
Kurt Kelman
AGENT

Oct. 18, 1966 R. WALKER 3,279,714

MAGNETIC TAPE RECORDERS

Filed Oct. 6, 1964 4 Sheets-Sheet 2

INVENTOR.
RONALD WALKER
BY Kurt Kelman
AGENT

Oct. 18, 1966 R. WALKER 3,279,714

MAGNETIC TAPE RECORDERS

Filed Oct. 6, 1964 4 Sheets-Sheet 3

INVENTOR
RONALD WALKER
BY Kurt Kelman
AGENT

MAGNETIC TAPE RECORDERS

Filed Oct. 6, 1964 4 Sheets-Sheet 4

INVENTOR.
RONALD WALKER
BY Kurt Kelman
AGENT

United States Patent Office 3,279,714

Patented Oct. 18, 1966

3,279,714

MAGNETIC TAPE RECORDERS

Ronald Walker, Norton, Stourbridge, England, assignor to BSR Limited, Stafford, England, a British company Filed Oct. 6, 1964, Ser. No. 402,027

Claims priority, application Great Britain, Oct. 10, 1963, 39,920/63

3 Claims. (Cl. 242—55.12)

This invention relates to sound recording and playback apparatus utilising magnetic tape and of the type now commonly known as "tape-recorders" wherein the tape is passed from one to another of two rotatable spools and past an assembly of transducer and erasure heads.

When the apparatus is being operated on "rewind" or "fast forward" transport of the tape when one or the other of the spool carriers is rotating at high speed acting as a take-up spool whilst the other spool is trailing, it is most desirable to avoid overspill of the tape from the trailing spool when the brakes are applied because it is most desirable to maintain the tape taut at all times between the two spools. Hence it is preferable for the braking arrangement to provide a greater breaking force on the trailing spool than on the take-up spool, it being appreciated that the operations of the spools are reversed depending upon whether the apparatus is running on "rewind" or "fast forward" operation.

There have been proposals on these recorders hitherto, for the use of pivotally mounted brake shoes so that in one direction of rotation a spool carrier exerts a torque on the pivoted arm carrying the brake shoe to urge this arm in a direction to increase the braking effect whilst in the opposite direction of rotation the reverse happens.

The object of the present invention is to provide an improved arrangement of this form of braking in a tape-recorder of the type above referred, which is hereinafter referred to as "the type specified."

In accordance with the invention, we provide a tape-recorder of the type specified wherein the spool carriers rotate about spaced parallel axes which are fixed in relation to the tape deck of the apparatus and wherein the braking arrangement comprises a pivoted braking arm carrying a brake shoe for each spool carrier, each arm being spring urged in the direction to engage the brake shoe with the periphery of the spool carrier, the brake arms being pivoted upon a single common control bar which extends parallel to a line joining the axes of the spool carriers and the distance between the pivotal axes of the brake arms being less than that between the axes of the spool carriers, each brake arm being positioned on the common control bar so that the point of contact between its brake shoe and associated spool carrier is to the outside of a line joining the pivotal axis of the arm and the spool carrier.

In the above statement and in the following description the expression "outside," when used in relation to a line joining the axes of a spool carrier and the pivot of its associated brake arm, means that side of the line which is remote from the spindle of the driving motor, such motor being disposed in between the two spool carriers at a position midway or at a position approximately midway therebetween and with its axis vertical and parallel to the axes of the spool carriers.

Heretofore, and for the remainder of this specification, the apparatus is described as though the tape-recorder were occupying a normal position on a horizontal surface with the spindles of the spool carriers in vertical positions, but this is only for the purpose of clarity in the description as it will be appreciated that such apparatus is capable of functioning with the tape deck set at an angle to the horizontal plane or with the tape deck in a vertical plane, in which latter case the spindles of the spool carriers would be horizontal.

There is hereinafter described, by way of example, and with reference to the accompanying drawings, one embodiment of braking arangement in accordance with the invention and this applied to a tape-recorder having an arrangement of spool carriers and control means as described in my copending application No. 402,025 of even date herewith and also having a jockey pulley arrangement and automatic switch-off arrangement as further described in my copending application Nos. 402,029 and 402,026, respectively of even date herewith. Reference should be made to such copending applications for a more detailed description of the complete apparatus to which the invention is applied.

Figure 1:
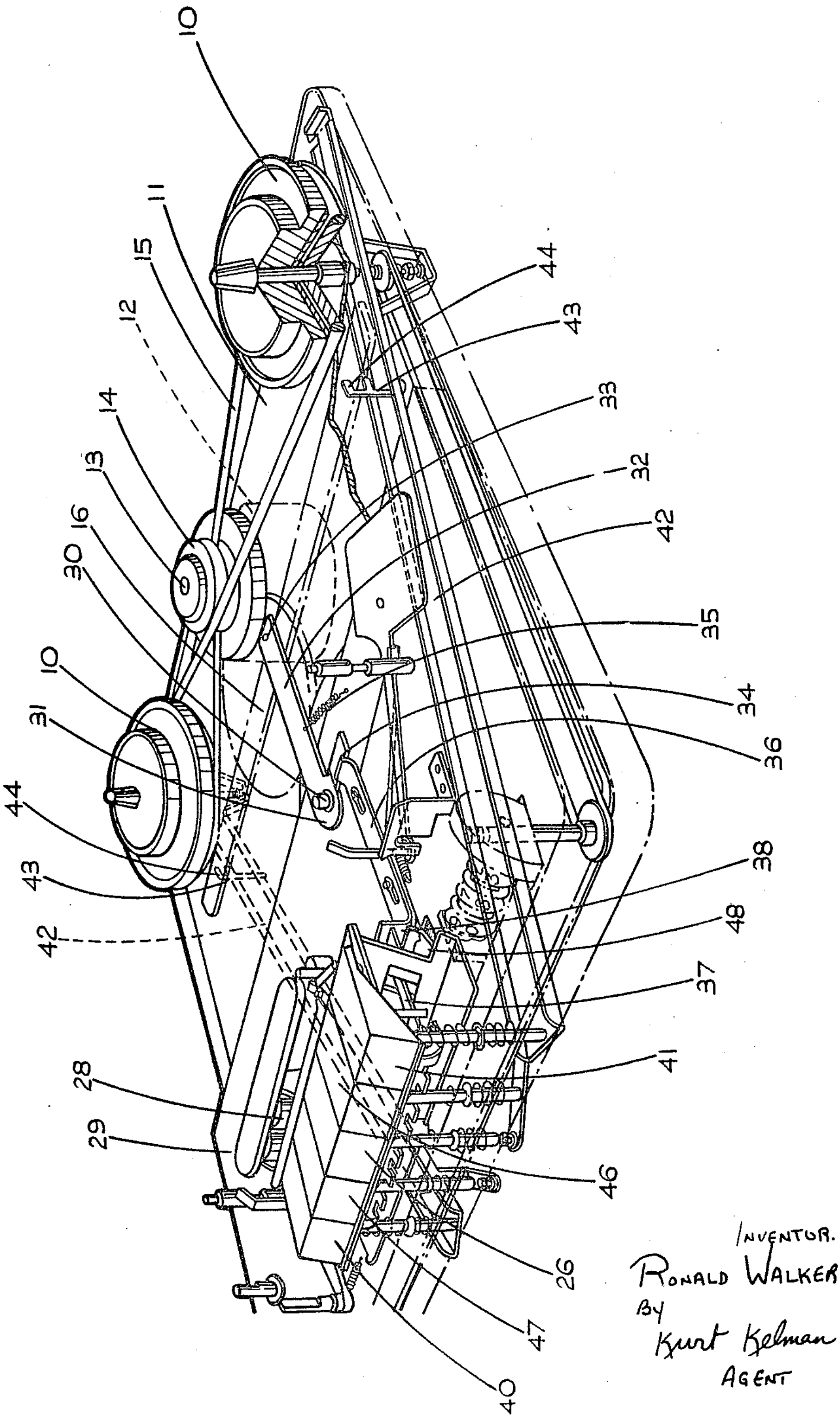
FIGURE 1 is a perspective view of the tape recorder, certain parts of the braking arrangement being removed for clarity.
Figure 2:
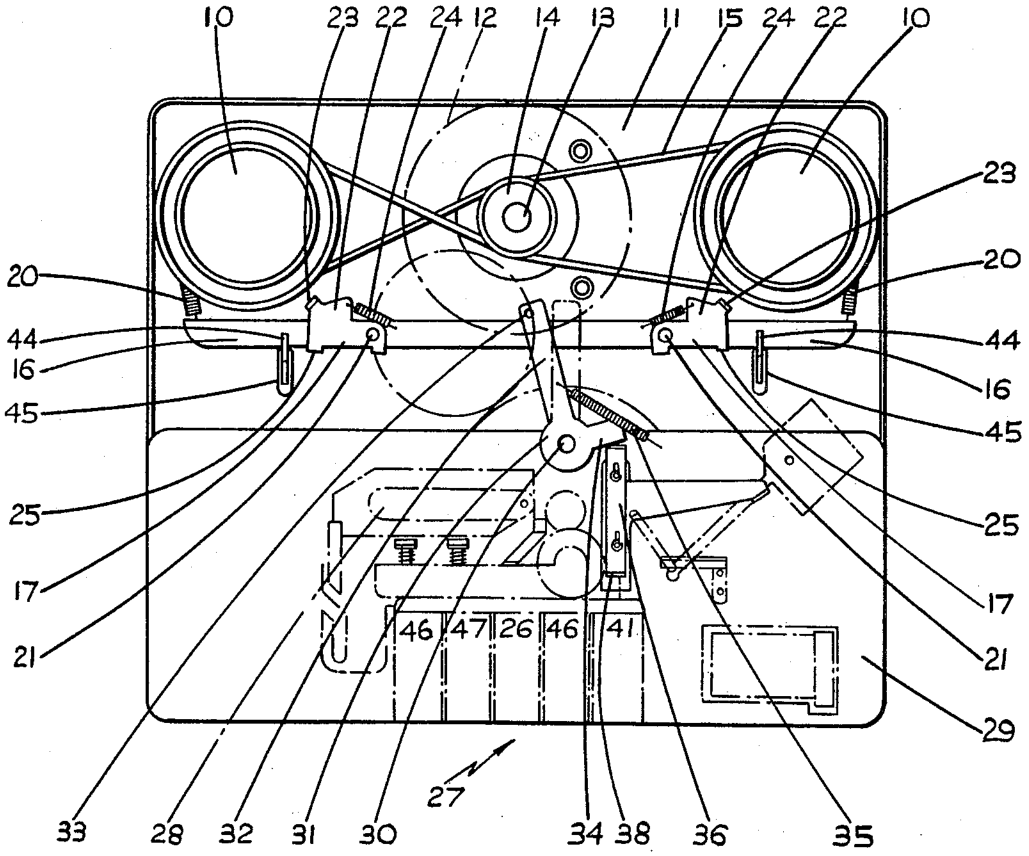
FIGURE 2 is a plan view showing the brakes in the "off" position.

Referring to the accompanying drawings, the spool carriers 10 are mounted upon spaced parallel axes on the upper side of the tape deck 11 with the driving motor 12 disposed approximately midway between the spool carriers and supported below the tape deck with its driving spindle 13 extending upwardly and with an arrangement of double pulley 14 and cross-over belt 15 for transmitting drive to the spool carriers 10 as more particularly described in my copending application number.

The braking arrangement according to the present invention, comprises a common control bar 16 which is mounted above the upper side of the tape deck 11 and extends transversely along a line parallel to the line joining the axes of the spool carriers 10 and the two brake arms 17 are mounted upon the upper flat face of this control bar whilst at each end the control bar has a downwardly projecting lug 18 which passes through a slot in the tape deck 11, such lug then being bent at right angles at 19 in the direction towards the spool carriers 10 so that the control bar is capable of limited rocking movement upon its two mounting lugs 18, such movement in the direction away from the spool carriers, being limited by engagement of the bent ends 19 of the lugs 18 against the underside of the tape deck 11.

At each side, a coil spring 20 is disposed, one end being attached to the adjacent lug 18 on the control bar and the other end being attached to the tape deck at a position to the other side of the associated spool carrier axis so that these two springs 20 urge the rockable control bar 16 in the direction towards the spool carriers.

Each braking arm 17 comprises a substantially flat bar which is pivoted to the upper face of the control bar 16 and these two pivotal axes 21 are spaced apart by a distance less than the distance between the axes of the spool carriers 10 so that they are located in the intervening space between the two parallel vertical planes containing the axes of the spool carriers. Each brake arm has a lug 22 extending in the direction towards its associated spool carrier, the outer end of said lug being provided with a pad 23 of friction material forming a brake shoe and there is provided a coil spring 24 attached at one end to the lug 22 adjacent the brake shoe 23 and attached at the other end to the control bar 16 at a position spaced inwardly towards the centre of the tape deck away from the pivotal axis 21 of the brake arm so that such spring tends to urge the brake arm 17 about its pivotal axis 21 into the position in which its brake shoe 23 engages the periphery of the spool carrier 10 and such inwards movement is limited by means of a downwardly extending lug 25 on the outer end of the brake arm engaging against that flat edge of the control bar 16 which is remote from the spool carriers.

The pivotal axis 21 of each brake arm is positioned so that the point of engagement between its brake shoe 23 and the periphery of the spool carrier, lies to the outside of a line joining the pivotal axis 21 of the brake arm and the axis of the associated spool carrier 10.

With this arrangement (considering the right hand spool carrier when viewed in plan), when this spool carrier is trailing and the brake is applied, the clockwise rotation of the spool carrier exerts a torque on the pivoted brake arm tending to move this in an anti-clockwise direction about its pivotal axis and thus increase the braking effect whereas when such spool carrier is acting as a take-up spool carrier and rotating in an anti-clockwise direction, then when the brake is applied the spool carrier exerts a torque on the brake arm tending to pivot this in a clockwise direction about its axis and thus decreasing the braking effect. The same consideration can be applied to the left-hand spool carrier and its associated brake.

Figure 3:
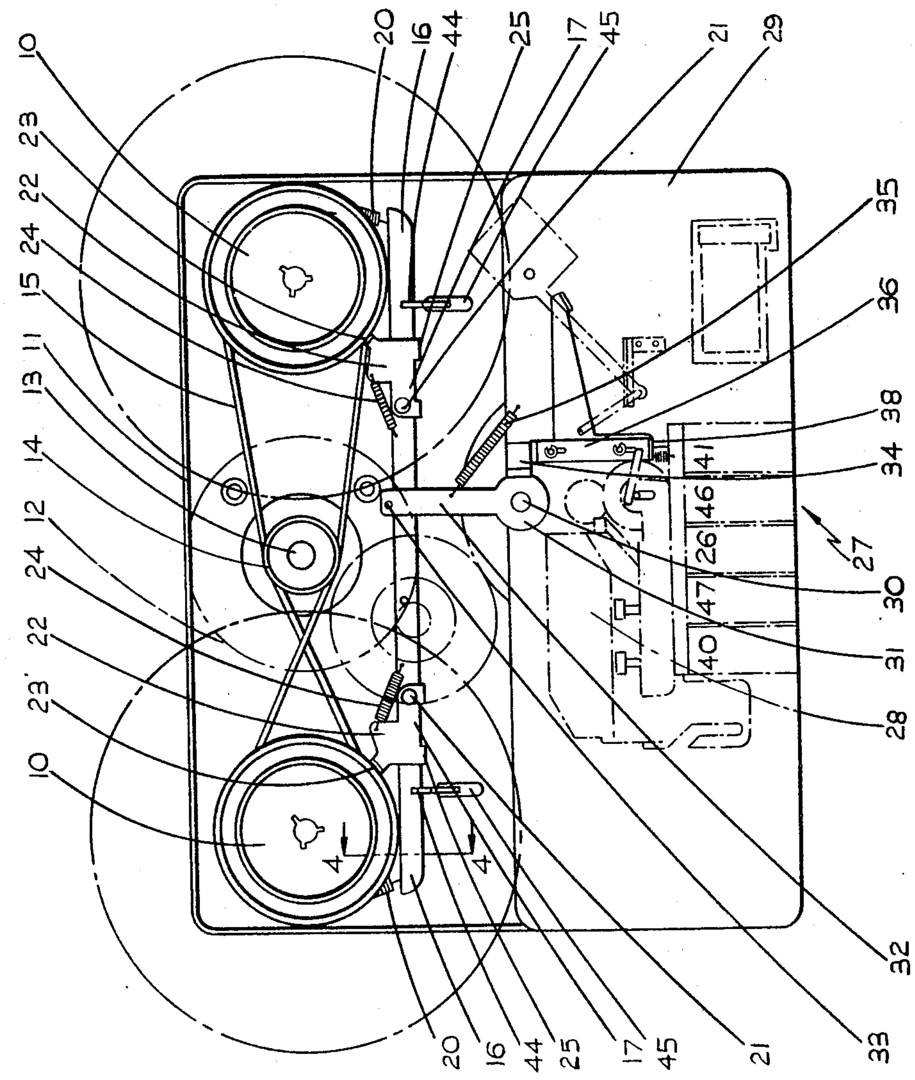
FIGURE 3 is a plan view showing the brakes in the "on" position.
Figure 4:
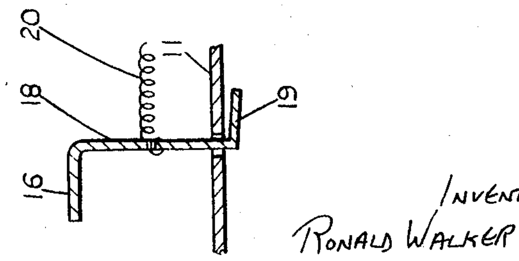
FIGURE 4 is an enlarged scrap section on line 4—4 of FIGURE 3.

Normally, in the stop condition of the apparatus (FIG. 3), the control bar 16 is in a forward position and the two brake shoes 23 are in engagement with their spool carriers and depression of the start finger lever 26 operates to rock the control bar rearwardly away from the spool carriers to withdraw the brake shoes from engagement. This is achieved by the following arrangement.

The control finger levers (in a bank of five at 27) and assembly of transducer heads 28 and certain other parts, are mounted upon a mounting plate 29 disposed a short distance above the tape deck 11 and at the edge of this plate nearest the spool carriers there is mounted, about a vertical axis 30, a bell-crank lever 31, one arm 32 of which projects in the direction towards the control bar and passes over the top of the control bar and has a downwardly projecting peg 33 engaging the edge of the control bar nearest the spool carriers.

The other arm 34 of this bell-crank lever extends at right angles to the first arm and a coil spring 35 attached between the first arm 32 of the bell-crank lever and the mounting plate 29 normally urges the bell-crank lever into a position in which its second arm 34 is pressed into engagement with the adjacent end of a sliding bar 36 mounted upon the mounting plate 29 and adapted to be shifted in the direction towards the control bar 16 when the start finger lever 26 is depressed. This shifting movement of the sliding bar 36 is achieved by an interlock plate 37 which is moved when the start finger lever 26 is depressed (see FIG. 6) and which engages an upturned lug 38 on the sliding bar 36 to move it in the direction to pivot the bell-crank lever 31 and cause its first mentioned arm 32 to withdraw the control bar 16 by rocking it away from the spool carriers.

Figure 6:
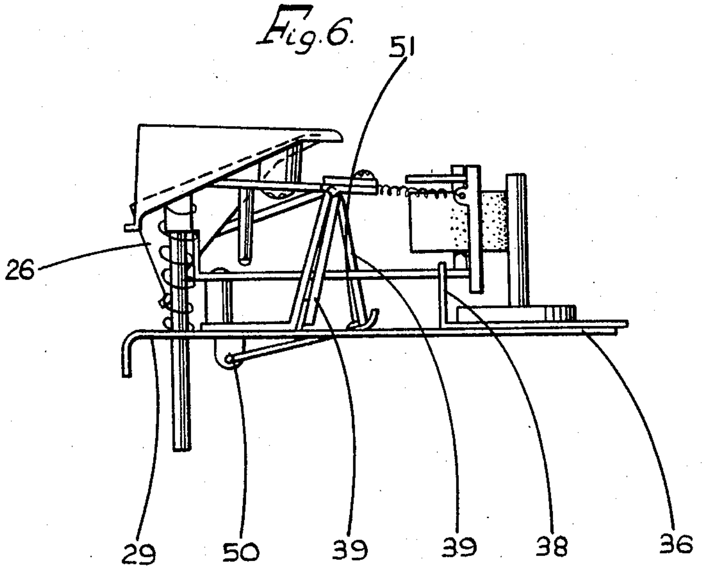
FIGURE 6 is a similar view showing the "start" finger lever depressed.

The construction and operation of the finger levers and interlock plate 37 are described in more detail in my copending application No. 402,025 but, briefly, the start finger lever 26 has a downwardly extending lug 39 which passes through a slot in the interlock plate so that pivotal movement of the finger lever causes sliding movement of the interlock plate 37 (as shown in FIG. 6).

Also the arrangement provides for withdrawal of the control bar 16 when either the "rewind" finger lever 40 is depressed or the "fast forward" finger lever 41 is depressed (see FIG. 1).

As described in my copending application No. 402,025 the depression of either the "rewind" or "fast forward" finger levers causes depression of an associated clutch actuating lever 42 extending below the tape deck 11 and each such clutch actuating lever 41 has connected thereto the lower end of a link 43, which is formed as a pressing and which passes upwardly through a slot 45 in the tape deck and has its upper end formed as a hook 44 which is connected to the control bar 16 so that when either the "rewind" or "fast forward" finger lever is depressed, the downwards movement of its associated clutch actuating lever 42 causes the common control bar 16 carrying the brake arms 17 also to be rocked away from the spool carriers, thus drawing the brakes out of engagement.

Figure 5:
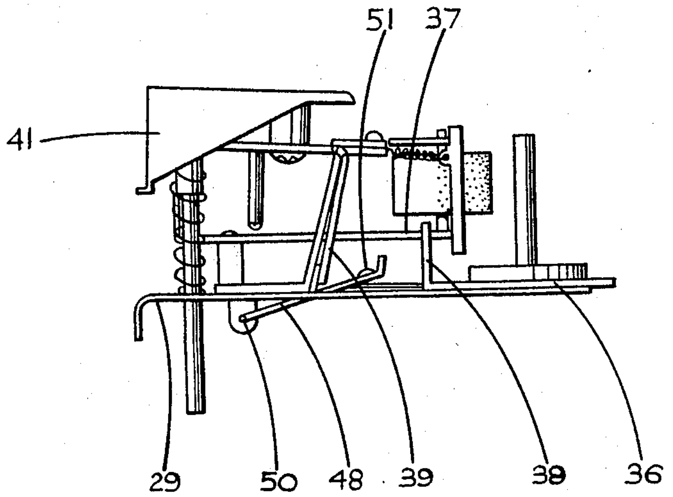
FIGURE 5 is a detail view looking at the right hand end of the bank of finger levers.

The various finger levers ("start" 26, "stop" 46, "rewind" 40 and "fast forward" 41), with the exception of the "pause" finger lever 47 which causes momentary pausing of the tape, each has a downwardly projecting lug 39 (as previously described for the start finger lever 26) adapted to co-operate with a latch plate 48 pivoted on the underside of the mounting plate 29 about a horizontal axis 50 to hold any one of the finger levers in its depressed position. The latch plate is pressed by a spring (not shown) in the upwards direction (FIG. 5).

Such latch plate has on its upper surface, a number of upstanding protuberances 51 and when a finger lever is depressed, its downwardly presented lug 39 rides over the associated protuberance 51 on the latch plate to depress the latch plate against the spring pressure until the protuberance 51 rides up behind the associated lug 39 (FIG. 6) to hold this in the depressed position until released by the operation of the stop finger lever 46.

The protuberance associated with the "stop" finger lever 46 is somewhat more prominent than the others so as to ensure that as soon as the lug 39 on the stop finger lever engages the face of its protuberance, this protuberance will be depressed to depress the latch plate 48 and thus release whichever other finger lever (26, 40 or 41) has been held down by the latch plate. This results in withdrawal of the interlock plate 37, permitting the bell-crank lever 31 to pivot and thus allow the common control bar 16 to rock forwardly under pressure of its springs 20 so that the braking arrangement takes place even before the stop lever has reached its fully depressed position. This ensures immediate operation of the brake as soon as the stop finger lever is pressed.

What I claim then is:

1. In a tape recorder wherein magnetic tape is drawn past an assembly of transducer and erasure heads from one to another of two spools mounted rotatably about spaced, parallel and vertical axes upon a tape deck, a braking arrangement comprising, a spool carrier for each spool rotatably mounted about a vertical axis on the tape deck, a control bar of straight elongated form disposed horizontally and parallel to the line joining the axes of the spool carriers, a braking arm, for each spool carrier, pivotally mounted about a vertical axis on said control bar, spring means acting on each said braking arm to urge it towards its associated spool carrier, the distance between the pivotal axes of the brake arms being less than that between the axes of the spool carriers, each brake arm being located on said control bar in such a position that the point of engagement between each said brake arm and its associated spool carrier is to the outside of a line joining the pivotal axis of the brake arm and the axis of its associated spool carrier, the control bar being mounted upon the tape deck so as to be rockable about a horizontal axis parallel to its length, spring means acting on the control bar urging it towards the spool carriers, a two-armed bell-crank lever pivotally mounted on the tape deck, one arm of said lever being engaged with the control bar, a plate mounted slidably on the tape deck and engaging the other arm of said bell-crank lever, and a "start" finger lever pivotally mounted on the tape deck and connected with said plate for causing movement thereof when said start finger lever is depressed to pivot said bell-crank lever in the direction to rock said control bar away from the spool carriers.

2. The structure claimed in claim 1 including, a clutch associated with each spool carrier, a pair of clutch-actuating levers, one for each clutch, extending below the tape-deck and a link connected between each clutch-actuating lever and the said control bar to cause rocking of the control bar when either clutch-actuating lever is moved.

3. The structure according to claim 1 including control finger levers for the "start," "stops," "rewind" and "fast-forward" operations of the tape recorder, such finger levers being mounted on the tape deck in side by side relationship for pivotal movement about a horizontal axis, a spring loaded latch plate pivotally mounted below the tape-deck and disposed below said finger-levers, a number of protuberances on said latch plate corresponding to the number of said finger levers, a depending lug on each finger lever for engaging a corresponding protuberance on the latch plate to hold each finger lever in its depressed position, the protuberance associated with the stop finger lever being greater than the remainder whereby engagement thereof by the depending lug on the stop finger lever causes movement of the latch plate to release from engagement with its protuberance any one of the other depending lugs so engaged, an interlock plate mounted for horizontal sliding movement below the finger levers and engaging said slidable plate which engages the one arm of the bell-crank lever, spring means acting on the bell-crank lever urging it in the direction to rock the control bar away from the spool carriers and means connecting said interlock plate with the start finger lever for retraction of said interlock plate upon release of said start finger lever.

References Cited by the Examiner

UNITED STATES PATENTS

| | | | |
|---|---|---|---|
| 2,712,369 | 7/1955 | Schroter | 242—55.12 X |
| 2,793,039 | 5/1957 | Hironimus | 274—4 |
| 2,939,644 | 6/1960 | Morrison et al. | 242—55.12 |

FRANK J. COHEN, *Primary Examiner.*

LEONARD D. CHRISTIAN, *Examiner.*